United States Patent
Garrec et al.

(10) Patent No.: US 9,784,830 B2
(45) Date of Patent: Oct. 10, 2017

(54) TRANSPONDER FOR DOPPLER RADAR, TARGET LOCATION SYSTEM USING SUCH A TRANSPONDER

(71) Applicant: THALES, Neuilly sur Seine (FR)

(72) Inventors: Patrick Garrec, Merignac (FR); Pascal Cornic, Guilers (FR); Régis Levaufre, Cavan (FR)

(73) Assignee: THALES, Courbevoie (FR)

( * ) Notice: Subject to any disclaimer, the term of this patent is extended or adjusted under 35 U.S.C. 154(b) by 304 days.

(21) Appl. No.: 14/175,620

(22) Filed: Feb. 7, 2014

(65) Prior Publication Data
US 2014/0225761 A1   Aug. 14, 2014

(30) Foreign Application Priority Data

Feb. 8, 2013 (FR) .................................. 13 00275

(51) Int. Cl.
| | |
|---|---|
| G01S 13/87 | (2006.01) |
| G01S 13/74 | (2006.01) |
| G01S 7/40 | (2006.01) |
| G01S 13/75 | (2006.01) |
| G01S 13/91 | (2006.01) |

(52) U.S. Cl.
CPC ............ G01S 13/74 (2013.01); G01S 7/4052 (2013.01); G01S 13/751 (2013.01); G01S 13/872 (2013.01); G01S 13/913 (2013.01); G01S 2007/4082 (2013.01)

(58) Field of Classification Search
CPC .............................. G01S 13/751; G01S 13/872
USPC ............................................................ 342/33
See application file for complete search history.

(56) References Cited

U.S. PATENT DOCUMENTS

| | | | | |
|---|---|---|---|---|
| 4,686,534 A | * | 8/1987 | Eddy ..................... | G01S 7/4052 342/160 |
| 2006/0022833 A1 | * | 2/2006 | Ferguson .............. | A63F 13/211 340/573.1 |
| 2008/0018525 A1 | * | 1/2008 | Svy ......................... | G01S 7/024 342/169 |
| 2012/0001794 A1 | * | 1/2012 | Levaufre ............... | G01S 7/4004 342/174 |

(Continued)

FOREIGN PATENT DOCUMENTS

| | | |
|---|---|---|
| EP | 2341363 A1 | 7/2011 |
| FR | 1563015 A | 4/1969 |
| WO | 0022454 A1 | 4/2000 |

*Primary Examiner* — Tashiana Adams
*Assistant Examiner* — Helena Seraydaryan
(74) *Attorney, Agent, or Firm* — Baker & Hostetler LLP

(57) ABSTRACT

A transponder, able to equip a cooperative target facing a Doppler radar, includes at least one receiving antenna able to receive a signal transmitted by said radar and a transmitting antenna able to retransmit a signal. The signal received by the receiving antenna is amplitude-modulated before being retransmitted by the transmitting antenna to produce a variation of the radar cross-section of the target, the variation triggering a frequency shift between the signal transmitted and the signal received by the radar comparable to a Doppler echo. The transponder applies notably to the field of radars, more particularly for collaborative systems also operating at low velocity or nil velocity. It applies for example to assisted take-off, landing and deck-landing of drones, in particular rotary-wing drones, as well as manned helicopters.

18 Claims, 2 Drawing Sheets

(56) References Cited

U.S. PATENT DOCUMENTS

2013/0194100 A1* 8/2013 Granhed .............. A63B 29/021
                                                                     340/584

* cited by examiner

TRANSPONDER FOR DOPPLER RADAR, TARGET LOCATION SYSTEM USING SUCH A TRANSPONDER

CROSS-REFERENCE TO RELATED APPLICATION

This application claims priority to foreign French patent application No. FR 1300275, filed on Feb. 8, 2013, the disclosure of which is incorporated by reference in its entirety.

FIELD OF THE INVENTION

The present invention relates to a transponder for Doppler radar. It also relates to a target location system using such a transponder.

The invention applies notably to the field of radars, more particularly for collaborative systems. It applies for example to the assisted take-off, landing and deck-landing of drones, in particular rotary-wing drones, as well as manned helicopters. More generally, it applies to the detection of fixed or slow-moving targets.

BACKGROUND

Assisted landing for manned aircraft or drones is achieved in a continuous manner using transponder beacons. The aircraft is equipped with at least one beacon, the latter re-transmitting received signals, the received signals originating from the transmission of a ground radar system. The echoes retransmitted by the beacon enable notably the radar system to compute the position of the beacon and therefore of the aircraft.

The beacons used are bistatic transponder beacons usually embodied with a frequency transposition making it possible to separate reception from transmission. Current solutions have several drawbacks.

They require a complicated and costly electronic system on board the targets, on board aircraft in particular. Such a system weighs a good deal, consumes large amounts of energy and offers relatively poor reliability.

Moreover, the occupied frequency band is wide whereas frequencies are becoming harder and harder to allocate. Filtering problems during use of this type of wideband solution are not easy to solve when the use of frequency agility is desired. Moreover, this solution is sensitive to vibrations because the quartz used to precisely generate the transposition frequency mixed with the received frequency is in the critical channel of the frequency retransmitted by the beacon.

Assisted landing systems, incorporating the beacons equipping aircraft must be precise and reliable, notably when landing is difficult and requires great precision, for example in the case of deck-landing. The deck-landing of a helicopter, manned or unmanned, may be considered by way of example. Assisted deck-landing is therefore carried out using transponder beacons equipping the helicopters. In the final phase of deck-landing, the helicopter moves at substantially the same velocity as the ship on which it must touch down. Its velocity is therefore quasi-nil with respect to this ship and therefore with respect to the radar system placed on this ship. Moreover, it is difficult to rely on the blade velocity, specifically because the blade velocity is inappropriate for precise measurements and contributes noise to the measurements. In particular, where the measurement of the blade flashes is concerned, the angular separation linked to "glint" effects is too large in relation to the precision of location required.

For this assisted landing radar system, the velocity of the target, the transponder beacon, is nil. The situation is therefore that of the detection of a fixed target. The echo produced by the beacon can then be difficult to intercept because it is drowned in the ambient noise. Increasing detection performance then necessitates an increase in the complexity of current systems such as for example the system described previously.

SUMMARY OF THE INVENTION

An object of the invention is notably to alleviate the aforementioned drawbacks, and notably to allow the production of cooperative systems capable of detecting fixed or slowly moving targets simply and at lower cost. With this aim, the subject of the invention is a transponder able to equip a cooperative target facing a Doppler radar, including at least one receiving antenna able to receive a signal transmitted by said radar and a transmitting antenna able to retransmit a signal, the signal received by said receiving antenna being amplitude-modulated before being retransmitted by said transmitting antenna to produce a variation of the radar cross-section of said target, said variation triggering a frequency shift between the signal transmitted and the signal received by said radar comparable to a Doppler echo.

In a particular embodiment, an amplifier being connected between the receiving antenna and the transmitting antenna, the amplitude modulation is performed by the modulation of the amplifier gain.

The modulation of the gain is for example obtained by the modulation of the supply voltage of the amplifier, said voltage being produced by a voltage generator. The modulation law is for example periodic.

Advantageously, the modulation law can be among the following: rectangular, triangular, sinusoidal, Gaussian, Hann, Hamming and Blackman-Harris.

Advantageously, the modulation law of the received signal is for example peculiar to said transponder, the latter being identifiable by said modulation law.

The receiving antenna is for example able to receive a signal in one polarization and the transmitting antenna to retransmit a signal in another polarization.

Since the transmitted power depends on the amplifier gain, the power of the transmitted signal is for example slaved to the power of the received signal by slaving of the amplifier gain to the power of the received signal.

Another subject of the invention is a target location system, said system including at least one transponder such as described previously, said target being equipped with said transponder, and at least one Doppler radar positioned on the ground, said radar detecting the Doppler echo produced by the amplitude modulation of the signal received by the transponder.

Said target is for example an aircraft, the system being able to guide the aircraft in the landing or deck-landing phase.

BRIEF DESCRIPTION OF THE DRAWINGS

Other characteristics and advantages of the invention will appear with the help of the following description, made with reference to the appended drawings, which show.

DETAILED DESCRIPTION

Figure 1:
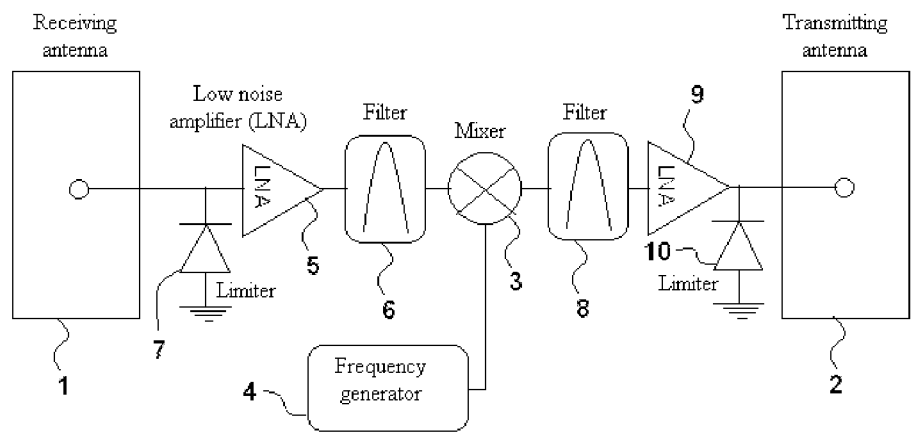
FIG. 1, an exemplary embodiment of a transponder of the prior art.

FIG. 1 illustrates an exemplary embodiment of a transponder of the prior art, the aircraft being equipped with such a transponder for assisted landing for example. The transponder, bistatic, has a receiving antenna 1 able to pick up signals transmitted by a ground radar system. It also has a transmitting antenna 2 able to retransmit the signals received via the receiving antenna. Between these two antennas 1, 2 the received signals are frequency transposed by means of a mixer 3. The latter has as inputs the received signal and a signal output by a frequency generator 4. Between the receiving antenna 1 and the mixer 3, the received signal is amplified then filtered. The amplification is carried out by means of a first low noise amplifier 5, the output of which is linked to the input of a second filter 6, the output of the latter being linked to the input of the mixer. A limiter 7 is for example situated at the output of the receiving antenna 1, before the amplifier 5. The mixer is followed by a second filter 8. The output of this second filter is linked to the input of a second low noise amplifier 9, the output of which is linked to the transmitting antenna 10. A limiter 10 is for example connected at the output of the second amplifier 9.

Figure 2:
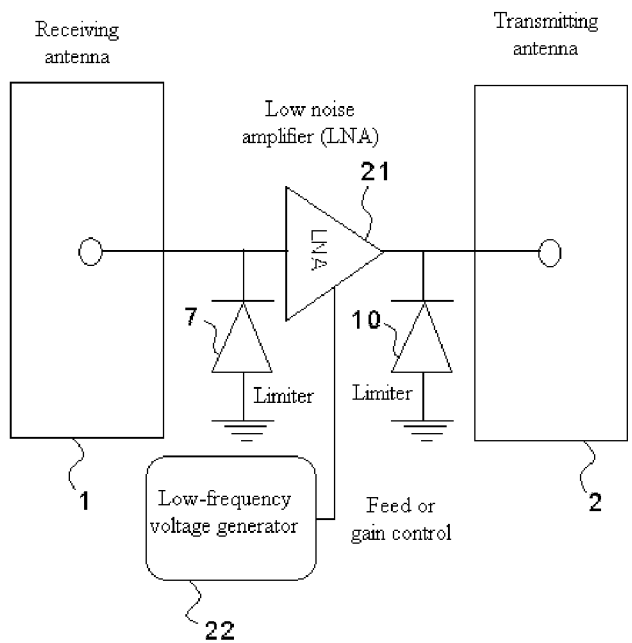
FIG. 2, an exemplary embodiment of a transponder of the invention.

FIG. 2 illustrates an exemplary embodiment of a transponder according to the invention. The transponder has at least one receiving antenna 1, a transmitting antenna 2 and an amplifier 21, the gain of which is controllable. The amplifier 21 gain is for example controlled by a voltage generator 22. For this purpose, the output of this voltage generator is for example linked to the power supply input of the amplifier. This generator 22 is able to generate voltage variations, these variations being able to take various periodic forms as will be described below, in a low-frequency range for example. The amplifier 21 is preferably a low noise amplifier.

Protection devices, such as limiters 7, 10 are for example placed at the input and output of the amplifier.

The voltage variations thus produced create a modulation of the gain of the amplifier 21 and therefore a modulation of the amplitude of the amplified signal. A transponder according to the invention therefore carries out the reception of a wave and its retransmission with the addition of an amplitude modulation. This signal thus modulated is thus considered as mobile with respect to a Doppler radar and frequency-shifted in the filter bank of the radar as a function of the amplitude modulation frequency. This is explained by the variation of the radar cross-section (RCS) linked to the modulation. The Doppler radar therefore considers the received signal as carrier of a false Doppler velocity to which the true Doppler velocity of the moving target is added. If the target is immobile, this true velocity is nil. Thus, the solution afforded by the invention is based on the addition of an artificial Doppler effect to make a fixed, or low-velocity target visible by a Doppler radar. This addition is generated in a simple and economical manner.

Thus, according to the invention, in an aircraft location system, notably for assisted landing and deck-landing, a cooperative target, an aircraft, facing a Doppler radar, is equipped with a transponder beacon as illustrated in FIG. 2, adding a Doppler effect to the echo and enabling detection and tracking even when the target is immobile. This transponder includes a set of two antennas, one receiving 1 and the other transmitting 2, linked by an amplitude-modulated low noise amplifier making it possible to artificially modulate the received radar wave and to add a Doppler effect linked to this modulation, the latter triggering a variation of the radar cross section of the target.

This frequency shift, with the Doppler added, notably makes it possible to move away in terms of frequency from the clutter regions and thus to improve detection of targets equipped with a transponder according to the invention. If the target includes its own velocity, mobile target, the Doppler of the latter is added to the shift thus produced.

Figure 3:
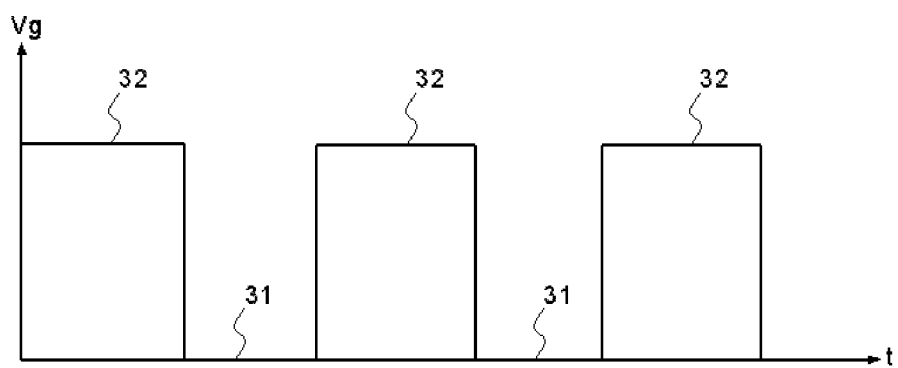
FIG. 3, an example of a law of modulation of the signals received by a transponder according to the invention.

The modulation can be On-Off Keying. In this modulation, the amplifier is successively supplied with voltage and unsupplied. FIG. 3 illustrates this modulation law. The voltage Vg delivered by the voltage generator 22 has a rectangular shape, of "gate" type, having only two values 31, 32, the low value 31 being able to be nil. The modulation frequency can be in the order of 800 Hz to 1000 Hz. The amplitude modulation produced by the amplifier on the received wave follows the voltage modulation. The choice of the modulation frequency depends partly on the repetition frequency of the radar signal (prf). For example, a percentage of the prf is chosen in such a way as to form a shift between the two frequencies.

With an amplitude modulation as illustrated by FIG. 3, at the radar processing level a product of convolution of the signal with a "gate" function is obtained, the result of which is a sin(x)/x signal, also called cardinal sine, i.e. a comb of lines which alias in the frequency spectrum. This slicing of the signal by the "gate" function can generate relatively large sidelobes.

By weighting the modulation signal by a suitable window, the effects of this division, especially the sidelobes, can be reduced. It is thus possible to weight the modulation signal by a triangular, sinusoidal, Gaussian, Hann, Hamming or Blackman-Harris window. The Fourier transform of the analysed signal is convolved with the transform of the window. The amplitudes of the sidelobes of the transformation are lowered.

The table below indicates the main characteristics of certain commonplace analysis windows as stated in the literature, usable as modulation laws:

| Window | Sidelobe (dB) | Slope (dB/oct) | Bandwidth (bins) | Worst case loss (dB) |
|---|---|---|---|---|
| Rectangular | −13 | −6 | 1.21 | 3.92 |
| Triangular | −27 | −12 | 1.78 | 3.07 |
| Hann | −32 | −18 | 2.00 | 3.18 |
| Hamming | −43 | −6 | 1.81 | 3.10 |
| Blackman-Harris | −67 | −6 | 1.81 | 3.45 |

Other examples are available in the work by M. Kunt "Traitement numérique des signaux", Editions Dunod.

The table above shows that the window of rectangular type is the least effective, the attenuation level of the sidelobes being only −13 dB. The most effective windows in terms of sidelobe attenuation are, from the least effective to the most effective, the triangular window, the Hann window, the Hamming window and the Blackman-Harris window, the sidelobes triggered by the latter having an attenuation level of −67 dB.

A simple modulation to carry out is a sine modulation which suppresses the carrier. It may however incur the risk of the carrier being in phase opposition with the skin echo or of the modulus varying considerably from one pulse to the next.

It is possible to use a pseudo-random modulation, which makes it possible to extend the range of velocities measurable by the bank of filters by removing the indeterminacies linked to aliasing.

Advantageously, the fact that the signal received by the transponder is amplified makes it possible to process greater target distances, the function being in this case akin to a communication function added to a radar function.

To carry out a measurement of the Doppler velocity operating by frequency ramps, it is necessary, and sufficient, to select the distance bin in which Doppler lines occur. By integration over time, it is possible to determine the velocity of the mobile before initializing the Doppler filter. Once the order of magnitude of the velocity is known, it is possible to select the beneficial Doppler lines in the distance bin in question with more certainty.

On principle, two lines symmetrical with respect to the modulation frequency of the power supply of the amplifier 21 of the transponder are found. By taking the half-sum of these two lines the modulation frequency is found and by taking the half-difference the Doppler velocity peculiar to the target is found. The measurement of the true Doppler velocity is possible and easy by removing the carrier, the Doppler velocity being equal to:

$$\frac{1}{2}((V_{carrier}+V_{Doppler})-(V_{carrier}-V_{Doppler})) \quad (1)$$

$V_{carrier}$ being the carrier velocity and $V_{Doppler}$ being the Doppler velocity.

The true Doppler velocity is still measurable, it is only shifted with respect to the central frequency by the frequency separation generated by the amplitude modulation in the transponder.

Apart from its simplicity of embodiment, one advantage of this solution is that it allows a shift of the frequency to be measured to the middle of the Doppler spectrum, and thus improves the target to ground clutter ratio, the ground clutter being in the low frequencies. This makes it possible to visualize even an immobile target, of nil velocity and nil Doppler, with a Doppler radar which naturally eliminates fixed targets. Advantageously, in the case of assisted landing applications for helicopters, the invention makes it possible to eliminate clutter from the blades, moved by the main or secondary rotor. For homodyne reception systems, the stability of the oscillators often has a tendency to render the filters close to the zero lines unusable because the stability is insufficient to extract slow targets from the ground clutter. On targets equipped with a transponder according to the invention it is possible to be free of these constraints.

Advantageously, it is possible to distinguish two targets, or more, by attributing a given amplitude modulation to each target. This amplitude modulation is controlled by the voltage generator 22 of each transponder specific to each target, to each aircraft for example.

It is also possible to widen the usable domain of Doppler frequencies by dynamic changing of the modulation frequency.

The invention also enables a selective response of the transponder beacon to a particular waveform, by addition of a shape recognition system. For example the transponder can respond to an interrogation made with frequency ramps and not pulses.

The invention also allows for a reception in one polarization and a transmission in the other polarization, crossed or circular. For this purpose, the receiving antenna 1 picks up the signals in one polarization and the transmitting antenna 2 retransmits the signals in another polarization.

In the case of a helicopter application, for example, the modulation of the polarization can be carried out by rotation of the antenna, in the case of a retransmission on the propeller.

It is possible to carry out blocking of the transmission by half-periods so as to be permanently in the central Wobbulation line of the division frequency to increase the velocity range and Doppler range.

The invention affords many more advantages. The radar balance, representative of the energy received, decreases according to a $1/R^2$ law instead of $1/R^4$, R being the distance from the target to the radar.

The invention is simple to implement. It provides better precision due to the absence of a frequency mixer or delay time, the other solutions being based on delays or transpositions generating delay.

It does not necessitate scanning for the frequency of the beacon, which by construction lies inside the reception band of the radar.

It allows the detection of very low Doppler velocities of targets sunk in clutter compared to what would have been detected by radar, by transposition of the signal to outside the clutter region.

It allows a desensitizing to thermal fluctuations of the carrier, the separation between the aliased velocities being equal to twice the Doppler velocity.

The necessary power for the measurements is low.

The transmitting power can be regulated by the voltage supplying the amplifier 21, generated by the voltage generator 22. A slaving of the transmitted power can be carried out as a function of the input power. Due to this, the closer the target is to the radar, the less it transmits to avoid placing the radar in saturation. The power of the transmitted signal is slaved to the power of the received signal by slaving of the amplifier gain to the power of the received signal. The power of the received signal can be measured with known means.

In a configuration in CW (continuous wave) transmission by the radar, there is an ambiguity in the distance but a very precise velocity measurement.

A transponder according to the invention can advantageously be used in an aircraft location system. Such a system includes at least one Doppler radar. The latter positioned on the ground makes use of the artificial Doppler echo produced by the amplitude modulation of the received signal by the transponder, the aircraft being equipped with the latter. The measurements of the distance and velocity of the transponder, therefore of the aircraft, carried out by the radar, are sent to processing means which deliver piloting instructions as a function of these measurements. These instructions can be sent by Hertzian transmission to pilots, by means of suitable interfaces, or to automatic piloting members in the case of auto-piloted systems, drones or robots for example.

Advantageously, the Doppler radar can measure distances on fixed targets, typically on aircraft equipped with the transponder, these aircraft travelling at the same velocity as the radar. Such is the case for assisted deck-landing of a helicopter, for example.

Conversely the beacon can be arranged on the ground and the radar on the aircraft. The measurements of velocity and position of the aircraft are then directly available in the aircraft without necessitating Hertzian transmission.

Another field of application is possible by equipping cooperative ground vehicles with beacons in order to follow these vehicles, including during stops, by an aircraft equipped with a Doppler radar. This can apply for example to aeroplanes on the ground during "taxiing", to robots on the ground or to deck-landings or dockings of ships at the quayside or at sea, etc.

The invention claimed is:

1. A transponder able to equip a cooperative target facing a Doppler radar, comprising:
    at least one receiving antenna able to receive a signal transmitted by said radar and a transmitting antenna able to retransmit a signal, the signal received by said receiving antenna being amplitude-modulated before being retransmitted by said transmitting antenna to produce a variation of a radar cross-section of said target, said variation triggering a frequency shift between the signal transmitted and the signal received by said radar comparable to a Doppler echo; and
    an amplifier being connected between the receiving antenna and the transmitting antenna,
    wherein amplitude modulation is performed by modulation of an amplifier gain,
    wherein power of the transmitted signal is controlled by power of the received signal by controlling the amplifier gain with the power of the received signal, and
    wherein the closer the target is to the radar, the less power the target transmits to avoid putting the radar in saturation.

2. The transponder according to claim 1, wherein the modulation of the amplifier gain is obtained by the modulation of supply voltage of the amplifier, said supply voltage being produced by a voltage generator.

3. The transponder according to claim 1, wherein the modulation of the amplifier gain is periodic.

4. The transponder according to claim 1, wherein the modulation of the amplifier gain is selected from the group consisting of:
    rectangular, triangular, sinusoidal, Gaussian, Hann, Hamming and Blackman-Harris.

5. The transponder according to claim 1, wherein modulation of the received signal is peculiar to said transponder, the transponder being identifiable by said modulation law.

6. The transponder according to claim 1, wherein the receiving antenna is able to receive a signal in one polarization and the transmitting antenna is able to retransmit a signal in another polarization.

7. A target location system including at least one transponder according to claim 1, said target being equipped with said transponder, and at least one Doppler radar positioned on the ground, said radar detecting the Doppler echo produced by the amplitude modulation of the signal received by the transponder.

8. The target location system according to claim 7, wherein said target is an aircraft.

9. The target location system according to claim 8, being able to guide the aircraft in a landing or deck-landing phase.

10. A transponder implemented in a cooperative target facing a Doppler radar, comprising:
    at least one receiving antenna configured to receive a signal transmitted by said Doppler radar;
    a transmitting antenna configured to retransmit a signal, the signal received by said receiving antenna being amplitude-modulated before being retransmitted by said transmitting antenna to generate a variation of a radar cross-section of said target, said variation comprising a frequency shift between the signal transmitted and the signal received by said Doppler radar comparable to a Doppler echo; and
    an amplifier being connected between the receiving antenna and the transmitting antenna,
    wherein amplitude modulation is performed by modulation of an amplifier gain,
    wherein a power of the transmitted signal is controlled by power of the received signal by controlling the amplifier gain with the power of the received signal, and
    wherein the closer a proximity of the target is to the radar, the less power the target transmits to reduce radar saturation.

11. The transponder according to claim 10, wherein the modulation of the amplifier gain is obtained by the modulation of supply voltage of the amplifier, said supply voltage being produced by a voltage generator.

12. The transponder according to claim 10, wherein the modulation of the amplifier gain is periodic.

13. The transponder according to claim 10, wherein the modulation of the amplifier gain is selected from the group consisting of:
    rectangular, triangular, sinusoidal, Gaussian, Hann, Hamming and Blackman-Harris.

14. The transponder according to claim 10, wherein modulation of the received signal is peculiar to said transponder, the transponder being identifiable by said modulation law.

15. The transponder according to claim 10, wherein the receiving antenna is able to receive a signal in one polarization and the transmitting antenna is able to retransmit a signal in another polarization.

16. A target location system including at least one transponder according to claim 10, said target being equipped with said transponder, and at least one Doppler radar positioned on the ground, said radar detecting the Doppler echo produced by the amplitude modulation of the signal received by the transponder.

17. The target location system according to claim 16, wherein said target is an aircraft.

18. The target location system according to claim 17, being able to guide the aircraft in a landing or deck-landing phase.

* * * * *